US 8,280,313 B2

(12) United States Patent
Ishii

(10) Patent No.: US 8,280,313 B2
(45) Date of Patent: Oct. 2, 2012

(54) BASE STATION SELECTING METHOD AND WIRELESS TERMINAL DEVICE

(75) Inventor: Kenichi Ishii, Tokyo (JP)

(73) Assignee: NEC Corporation, Tokyo (JP)

(*) Notice: Subject to any disclaimer, the term of this patent is extended or adjusted under 35 U.S.C. 154(b) by 193 days.

(21) Appl. No.: 12/738,008

(22) PCT Filed: Oct. 31, 2008

(86) PCT No.: PCT/JP2008/069868
§ 371 (c)(1),
(2), (4) Date: Apr. 14, 2010

(87) PCT Pub. No.: WO2009/057745
PCT Pub. Date: May 7, 2009

(65) Prior Publication Data
US 2010/0222082 A1 Sep. 2, 2010

(30) Foreign Application Priority Data

Nov. 2, 2007 (JP) ................................. 2007-286569

(51) Int. Cl.
H04B 11/00 (2006.01)
(52) U.S. Cl. ..................................... 455/67.16; 455/421
(58) Field of Classification Search ............... 455/67.16, 455/421
See application file for complete search history.

(56) References Cited

U.S. PATENT DOCUMENTS 5,579,535 A * 11/1996 Orlen et al. .................... 455/421
6,701,132 B1 * 3/2004 Fukuzawa et al. .......... 455/67.16

FOREIGN PATENT DOCUMENTS

| JP | 3-268597 A | 11/1991 |
| JP | 10-98759 A | 4/1998 |
| JP | 2000111648 A | 4/2000 |
| JP | 2003110579 A | 4/2003 |
| JP | 2004320429 A | 11/2004 |
| JP | 2005086421 A | 3/2005 |
| JP | 2006238343 A | 9/2006 |
| WO | 2007108407 A | 9/2007 |

OTHER PUBLICATIONS

International Search Report for PCT/JP2008/069868 mailed Dec. 9, 2008.

* cited by examiner

Primary Examiner — William D Cumming

(57) ABSTRACT

A base station selecting method of this invention includes the steps of causing each of a plurality of ID transmitters (102) provided in the communication range of a wireless base station (103) to transmit location ID information for identifying the installation location of the ID transmitter (102) by a near field wireless communication scheme, and when a wireless terminal device (101) has received the location ID information, determining a connection destination wireless base station (103) based on the received location ID information. This makes it possible to speed up search processing and switch processing of the wireless base station (103) while suppressing an increase in the cost of the wireless terminal device (101) and also facilitate coverage design and coverage change of the wireless base station (103).

2 Claims, 6 Drawing Sheets

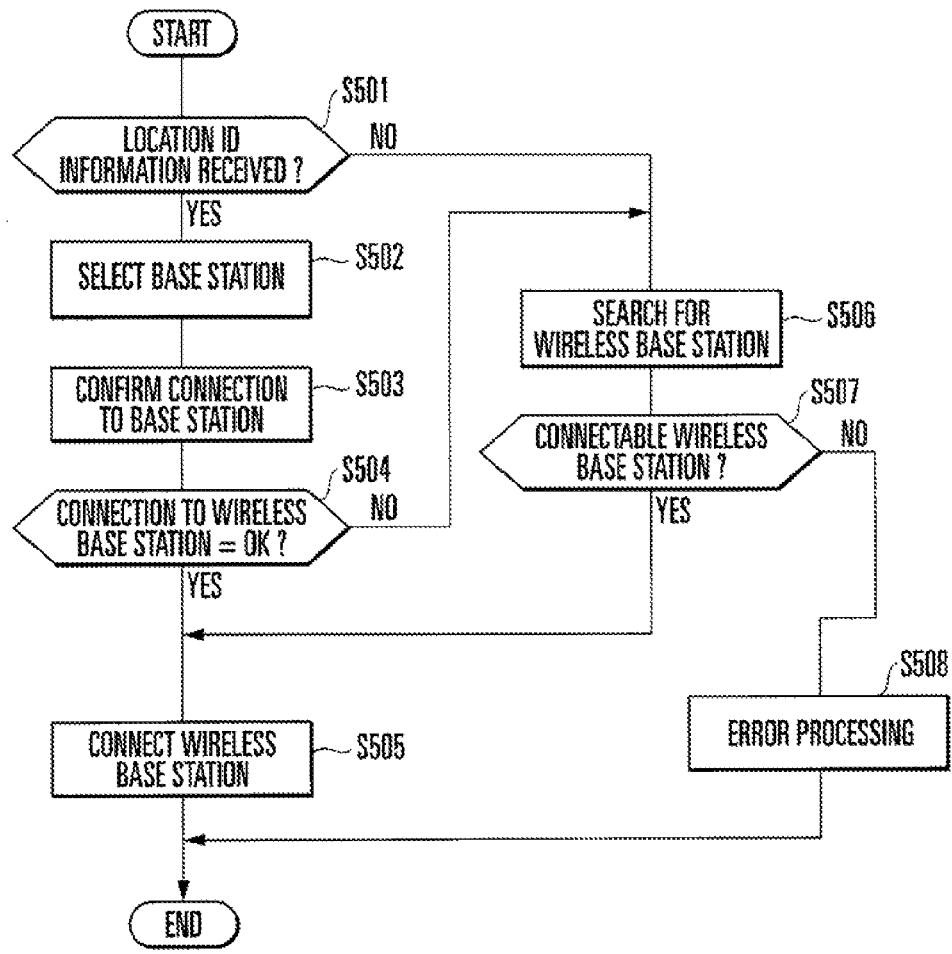
F I G. 5

BASE STATION SELECTING METHOD AND WIRELESS TERMINAL DEVICE

TECHNICAL FIELD

The present invention relates to a base station selecting method of causing a wireless terminal device to select a wireless base station, and a wireless terminal device using the base station selecting method.

BACKGROUND ART

A wireless terminal device which exists in a wireless communication system selects one of a plurality of wireless base stations to relay communication, and communicates via the wireless base station. Generally, as described in reference 1 (Japanese Patent Laid-Open No. 3-268697), a wireless terminal device which is going to connect to another wireless terminal device measures the received field strength and the like of a radio signal from one or a plurality of wireless base stations located around the wireless terminal device, and selects a wireless base station based on the measurement result. For example, a wireless base station which outputs a radio signal with a highest received field strength is selected.

When using the method of selecting a wireless base station based on the received field strength, the wireless terminal device monitors radio signals from the wireless base station even during connection with the selected wireless base station. Upon detecting that the received field strength has fallen below a predetermined value, the wireless terminal device starts processing of searching for a switch destination wireless base station. Upon detecting a radio signal having a received field strength higher than that of the radio signal from the currently connected wireless base station, the wireless terminal device switches the connection destination wireless base station from the currently connected wireless base station to the wireless base station which output the radio signal with a higher received field strength.

There also exists a method described in Reference 2 (Japanese Patent Laid-Open No. 10-98759), in which a wireless terminal device includes a database that stores information representing coverage areas in correspondence with base stations, and a self device position detection unit such as a GPS (Global Positioning System) receiver so as to select a wireless base station that covers the self device position detected by the self device position detection unit.

Note that reference 3 (Japanese Patent Laid-Open No. 2003-110579) describes a method of, in a system including an apparatus for implementing a service requested by a wireless terminal device via wireless communication, causing the wireless terminal device to receive, using a near field communication scheme, device identification information from the apparatus for implementing the service. In addition, reference 4 (Japanese Patent Laid-Open No. 2006-238343) describes a method of, in a system which causes a plurality of wireless terminal devices to communicate via wireless access points, causing the wireless terminal devices to receive, using a near field communication scheme, predetermined information from the wireless access points.

DISCLOSURE OF INVENTION

Problems to be Solved by the Invention

When the method of selecting a wireless base station based on the received field strength or the like is used, the coverage (communication range) of a wireless base station largely depends on the radio propagation environment. More specifically, which wireless base station is to be connected to a wireless terminal device located at which position largely depends on the radio propagation environment. In actuality, the radio propagation environment is complex. Hence, the coverage of each wireless base station generally has a complex shape. For this reason, the wireless terminal device may select a wireless base station the system designer of the wireless communication system did not expect to select. As a result, connection requests may concentrate in a certain wireless base station, resulting in degradation in the connection serviceability of the wireless base station.

Additionally, if there are a number of usable radio channels whose received field strengths are equal to or more than a predetermined value, the wireless terminal device needs to check the quality (e.g., received field strengths) of all usable radio channels and detect an optimum wireless base station. This prolongs the time until wireless base station selection.

Using the method described in reference 2 enables the wireless terminal device to search the database using the self device position detected by the self device position detection unit and select a wireless base station in a short time. This also lowers the probability that the wireless terminal device selects a wireless base station the system designer did not expect to select.

However, to use the method described in reference 2, the wireless terminal device needs to incorporate the database and the self device position detection unit such as a GPS receiver. When a GPS receiver is incorporated, the wireless terminal device also needs to have a function of calculating coordinates based on a signal received by the GPS receiver. Mounting the database storing information representing coverage areas and the GPS function including the GPS receiver makes the wireless terminal device expensive.

Furthermore, the wireless terminal device cannot select a wireless base station in an environment such as an underground market where radio waves from a GPS satellite cannot be received. Hence, a wireless terminal device which is often used in such an environment where radio wave reception is impossible needs to have a self device position detection unit other than the GPS function.

When new wireless base stations have been established, the database is preferably updated. However, the data amount of the database is enormous because it stores information representing coverage areas (for example, information of the latitudes and longitudes of coverage area boundaries), and updating the database mounted in each wireless base station requires time and cost. Instead of mounting the database on each wireless base station, the wireless terminal device may be designed to inquire of, e.g., a server apparatus storing the database about a wireless base station that covers the self device. In this case, however, the wireless terminal device must send inquiries to the server apparatus or the like as needed when selecting a wireless base station and during communication.

An exemplary object of the present invention is to provide a base station selecting method and a wireless terminal device which can speed up base station search processing and switch processing of the wireless terminal device while suppressing an increase in the cost of the wireless terminal device, and also facilitate coverage design and coverage change of a wireless base station.

Means of Solution to the Problem

A base station selecting method according to an exemplary aspect of the invention includes the steps of causing each of a plurality of ID transmitters provided in a communication range of a wireless base station to transmit location ID information for identifying an installation location of the ID transmitter by a near field wireless communication scheme, and when a wireless terminal device has received the location ID information from at least one ID transmitter, determining a connection destination wireless base station based on the received location ID information.

A wireless terminal device according to another exemplary aspect of the invention includes a location ID receiving unit which receives location ID information from a plurality of ID transmitters, the plurality of ID transmitters being provided in a communication range of a wireless base station to transmit the location ID information for identifying an installation location of each ID transmitter, and a base station selection control unit which, when the location ID receiving unit has received the location ID information from at least one ID transmitter, determines a connection destination wireless base station based on the received location ID information.

Effects of the Invention

According to the present invention, it is possible to speed up base station search processing and switch processing while suppressing an increase in the cost of a wireless terminal device, and also facilitate coverage design and coverage change of a wireless base station.

BRIEF DESCRIPTION OF DRAWINGS

FIG. 5 is a flowchart illustrating the base station selecting method;

BEST MODE FOR CARRYING OUT THE INVENTION

First Exemplary Embodiment

Figure 1:
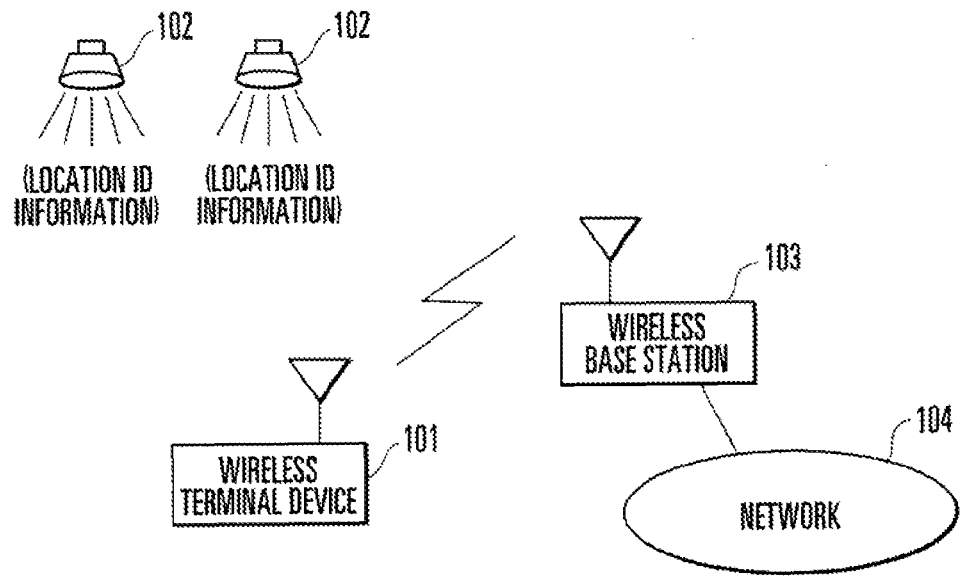
FIG. 1 is a conceptual view showing a wireless communication system using a base station selecting method according to the present invention.

FIG. 1 is a conceptual view showing a wireless communication system using a base station selecting method according to the present invention. As shown in FIG. 1, a wireless terminal device 101 communicates with another device via a wireless base station 103 and a network 104. Note that although FIG. 1 illustrates only one wireless terminal device 101, the system can include a number of wireless terminal devices. In addition, although FIG. 1 illustrates only the wireless base station 103 which directly communicates with the wireless terminal device 101, the system can include a number of wireless base stations.

The wireless terminal device 101 is, for example, a cellular phone or a PDA (Personal Digital Assistant) or personal computer having a wireless communication function. However, a terminal device of any form is applicable if it has the wireless communication function. The wireless base station 103 need not always be a base station in a cellular phone network but may be an access point or the like in a wireless LAN.

As shown in FIG. 1, the wireless communication system includes ID (identifier) transmitters 102 each of which transmits a location ID signal containing location ID information to identify its installation location. The location ID information uniquely represents each ID transmitter. Note that although FIG. 1 illustrates two ID transmitters 102, the system can include more ID transmitters. The ID transmitter 102 transmits a location ID signal by, for example, an infrared signal, a radio wave signal based on Bluetooth® or the like, or an ultrasonic signal. That is, the wireless terminal device 101 receives a location ID signal from the ID transmitter 102 using a near field wireless communication scheme (for example, the communicable range is 100 m or less).

Figure 2:
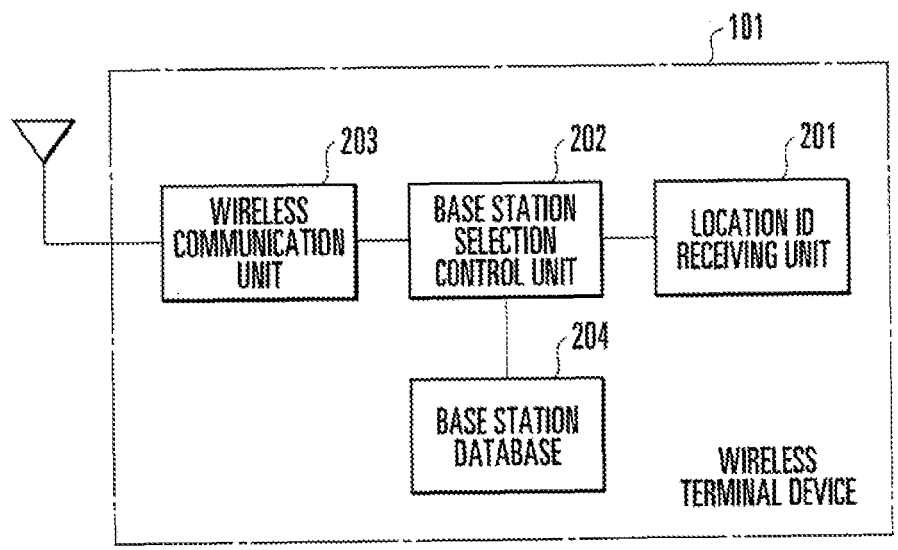
FIG. 2 is a block diagram showing an example of the arrangement of a wireless terminal device.

FIG. 2 is a block diagram showing an example of the arrangement of the wireless terminal devise 101. As shown in FIG. 2, the wireless terminal device 101 includes a location ID receiving unit 201, base station selection control unit 202, wireless communication unit 203, and base station database 204. The location ID receiving unit 201 has a function of receiving a location ID signal transmitted from the ID transmitter 102 or the like. The wireless communication unit 203 has a function of performing processing (e.g., modulation/demodulation, frequency conversion, and amplification) concerning communication with the wireless base station 103 or the like via an antenna. The base station database 204 has a function of holding information necessary for selecting a wireless base station. The ID transmitter 102 has a function of selecting a connection destination wireless base station based on location ID information contained in the location ID signal received by the location ID receiving unit 201 and the information held in the base station database 204. Note that the wireless terminal device 101 also includes an input unit such as keys, a display unit, an output unit configured to output a voice and the like, and a control unit configured to control these units, though they are not illustrated in FIG. 2. The base station database 204 is an example of a conversion table.

Figures 3, 4:
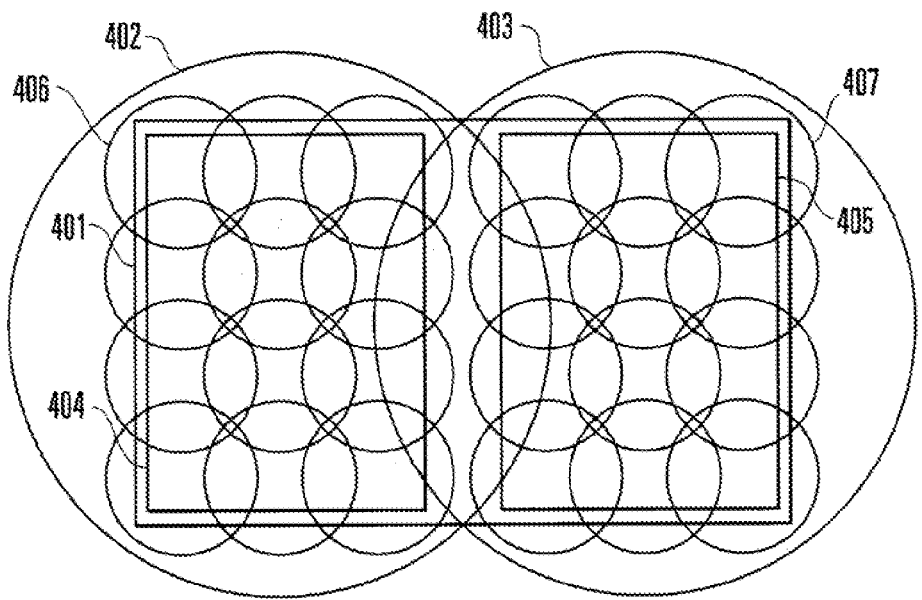
FIG. 3 is an explanatory view showing an example of information held in a base station database.
FIG. 4 is an explanatory view showing an example of the coverages of wireless base stations and the receivable ranges of location ID signals from ID transmitters in an actual environment.

FIG. 3 is an explanatory view showing an example of information held in the base station database 204. In the example of FIG. 3, the base station database 204 holds pairs of location ID information 301 and base station information 302. The base station information 302 uniquely represents each wireless base station such as the wireless base station 103 which exists in the system. Note that the pieces of information held in the base station database 204 as shown in FIG. 3 are, for example, written from an external device via an external interface of the wireless terminal device 101 when introducing the wireless terminal device 101, or downloaded from a server apparatus or the like by wireless communication when activating the wireless terminal device 101.

In the example of FIG. 3, a wireless base station is specified by the fourth lowest digit (the fourth digit from the right) of the 8-digit location ID information 301. Digits represented by "x" in the location ID information 301 are not used to specify a wireless base station. For example, the fourth lowest digit of the location ID information 301 set in a first line 303 is "1", which indicates that the information corresponds to wireless base station 1 regardless of the values of the remaining digits. The fourth lowest digit of the location ID information 301 set in a second line 304 is "2", which indicates that the information corresponds to wireless base station 2 regardless of the values of the remaining digits. Note that the location ID information 301 having eight digits and using the fourth lowest digit to specify a wireless base station are merely examples.

In the example of FIG. 3, the base station database 204 holds one piece of location ID information 301 associated with one piece of base station information 302. However, the base station database 204 may hold one piece of location ID information 301 associated with a plurality of pieces of base station information 302. When holding one piece of location ID information associated with a plurality of pieces of base station information 302, priority orders may be assigned to the plurality of pieces of base station information 302.

FIG. 4 is an explanatory view showing an example of the coverages (communication ranges) of the wireless base stations and the coverages (communication ranges, i.e., the receivable ranges of location ID signals from the ID transmitters) of the ID transmitters in an actual environment. Two large circles indicate coverages 402 and 403 of the wireless base stations. A number of small circles indicate receivable ranges 406 and 407 of location ID signals from the ID transmitters. Note that in FIG. 4, only two of the receivable ranges of location ID signals from a number of ID transmitters have reference numerals.

FIG. 4 corresponds to a sketch of a floor 401 viewed from right above in which two wireless base stations are installed. The floor 401 is divided into two zones 404 and 405. One wireless base station (not illustrated in FIG. 4) is installed in each of the zones 404 and 405.

In the example of FIG. 4, for example, a wireless terminal device which exists in the receivable range 406, i.e., a wireless terminal device which has received a location ID signal from the ID transmitter that covers the receivable range 406 selects the wireless base station that covers the coverage 402. A wireless terminal device which exists in the receivable range 407, i.e., a wireless terminal device which has received a location ID signal from the ID transmitter that covers the receivable range 407 selects the wireless base station that covers the coverage 403.

Note that FIG. 4 shows an example in which wireless base stations are installed in the floor 401. However, the base station selecting method of this exemplary embodiment is usable not only when wireless base stations are installed in the floor 401 but also when wireless base stations are installed in another place such as outdoors.

The base station selecting method will be described next with reference to the flowchart of FIG. 5. A case will be exemplified here in which out of a number of wireless terminal devices, the wireless terminal device 101 selects a wireless base station in accordance with the base station selecting method. Reception of a location ID signal containing location ID information will be expressed as reception of location ID information hereinafter.

The wireless terminal device 101 executes processing shown in FIG. 5 upon power-on or periodically. In the wireless terminal device 101, the base station selection control unit 202 confirms whether the location ID receiving unit 201 is receiving location ID information (step S501). If the location ID receiving unit 201 is not receiving location ID information, the process advances to step S506. If the location ID receiving unit 201 is receiving location ID information, the base station selection control unit 202 executes base station selection processing in accordance with a predetermined rule (conversion rule) (step S502).

The predetermined rule is as follows. If the location ID receiving unit 201 is receiving only one piece of location ID information, the base station selection control unit 202 selects a wireless base station represented by base station information held in the base station database 204 in association with the location ID information.

If the location ID receiving unit 201 is receiving a plurality of pieces of location ID information, the base station selection control unit 202 selects a wireless base station represented by base station information held in association with location ID information received first. Note that the base station selection control unit 202 may select a wireless base station represented by base station information held in association with location ID information received last. If a priority order is assigned to each location ID information in advance, and the location ID receiving unit 201 is receiving a plurality of pieces of location ID information, the base station selection control unit 202 may select a wireless base station represented by base station information held in association with location ID information with a highest priority order.

Next, the base station selection control unit 202 causes the wireless communication unit 203 to execute processing of confirming the possibility/impossibility of connection to the selected wireless base station (step S503). For example, if the received field strength of a radio signal from the selected wireless base station is equal to or more than a predetermined value, the wireless communication unit 203 notifies the base station selection control unit 202 that connection is possible. If connection is possible (step S504), the wireless communication unit 203 connects the wireless base station as a partner wireless base station to perform actual communication (step S505).

If connection to the selected wireless base station is impossible, the wireless communication unit 203 notifies the base station selection control unit 202 that connection is impossible, and executes general wireless base station search processing (step S506). The general wireless base station search processing detects, for example, whether the received field strength of a radio signal from a wireless base station is equal to or more than a predetermined value. Upon detecting a wireless base station with a received field strength equal to or more than the predetermined value, it is determined that a connectable wireless base station is present, and the process advances to step S505. If no connectable wireless base station has been found (step S507), predetermined error processing is performed (step S508), and the processing ends.

Note that when the base station database 204 holds one piece of location ID information 301 associated with a plurality of pieces of base station information 302, and connection to the selected wireless base station is impossible in the process of step S504, the process of step S503 may be executed again for another base station specified by base station information corresponding to the received location ID information.

Alternatively, when the location ID receiving unit 201 has received a plurality of pieces of location ID information in the process of step S501, and connection to the selected wireless base station is impossible in the process of step S504, the process of step S503 may be executed again for another base station specified by base station information corresponding to another location ID information.

As described above, in this exemplary embodiment, a plurality of ID transmitters are provided in the coverages of wireless base stations. As shown in FIG. 4, the ID transmitters cover the entire usable range (in the example of FIG. 4, the interiors of the zones 404 and 405) of a wireless terminal device in the coverages of the wireless base stations. Additionally, the wireless terminal device has the base station database 204 which holds pairs of location ID information 301 and base station information 302. The wireless terminal device selects a wireless base station corresponding to location ID information received from an ID transmitter.

The base station database 204 need not hold information representing the coverage areas of wireless base stations in an enormous data amount as information for specifying a wireless base station. The base station database 204 holds only the location ID information. For this reason, the capacity of the base station database 204 can be smaller than that when holding information representing the coverage areas of wireless base stations. This allows to suppress the increase in the cost of the wireless terminal device. In addition, when location ID information has been received, the wireless terminal device need not execute the general wireless base station search processing. This enables to speed up base station search processing.

The coverage of a wireless base station is equivalently implemented by a set of coverages of ID transmitters. The ID transmitter coverages are finer than the actual wireless base station coverages. The wireless terminal device receives location ID information from an ID transmitter by a near field communication scheme, and is therefore rarely influenced by the radio propagation environment concerning the location ID information. This lowers the probability that the wireless terminal device selects a wireless base station the system designer of the wireless communication system did not expect to select. That is, the probability that the system operates as designed by the system designer becomes high. As a result, coverage design and coverage change of a wireless base station are facilitated. This is because the need for making coverage design and coverage change in consideration of the influence of the radio propagation environment or the like decreases.

Second Exemplary Embodiment

Figure 6:
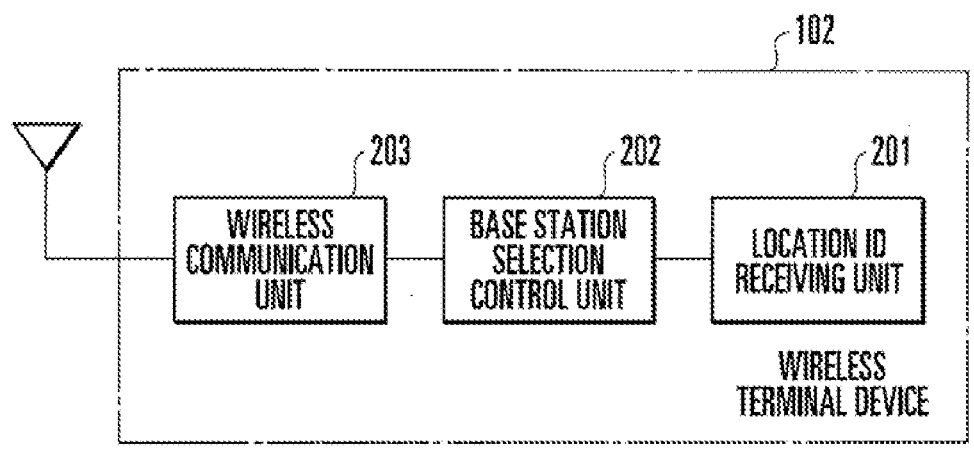
FIG. 6 is a block diagram showing an example of the arrangement of a wireless terminal device according to the second exemplary embodiment.

FIG. 6 is a block diagram showing an example of the arrangement of a wireless terminal device 102 according to the second exemplary embodiment. As shown in FIG. 6, the wireless terminal device 102 includes a location ID receiving unit 201, base station selection control unit 202, and wireless communication unit 203, like the wireless terminal device 101. However, the wireless terminal device 102 has no base station database 204 that is provided in the wireless terminal device 101 shown in FIG. 2. Note that the arrangement of a wireless communication system to which the second exemplary embodiment is applied is the same as that shown in FIG. 1 except that the wireless terminal device 102 exists in place of the wireless terminal device 101. In the second exemplary embodiment as well, a plurality of ID transmitters are installed in the coverage of each wireless base station, as shown in FIG. 4.

Figure 7:
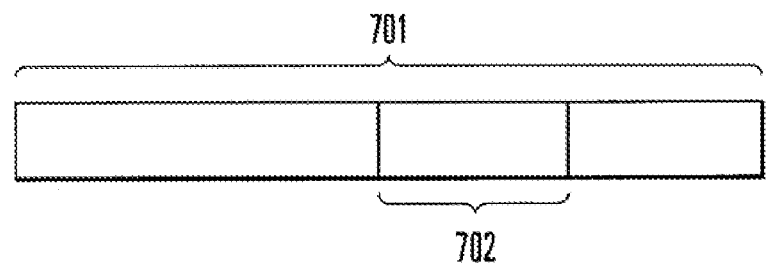
FIG. 7 is an explanatory view showing an example of the format of a location ID signal transmitted from an ID transmitter according to the second exemplary embodiment.

FIG. 7 is an explanatory view showing an example of the format of a location ID signal 701 transmitted from an ID transmitter 102 according to the second exemplary embodiment. In the example of FIG. 7, the location ID signal 701 for identifying the installation location of the ID transmitter 102 contains base station information 702 for specifying a wireless base station. Like the base station information 302 shown in FIG. 3, the base station information 702 uniquely represents each wireless base station such as a wireless base station 103 which exists in the system. The base station information 702 is, for example, the address information or channel number of a wireless base station.

In the second exemplary embodiment as well, the wireless terminal device 102 executes the base station selecting method shown in FIG. 5. In the second exemplary embodiment, since the location ID signal 701 contains the base station information 702, the wireless terminal device 102 can immediately select a wireless base station upon receiving location ID information without referring to a base station database. It is therefore possible to further speed up base station search processing. Additionally, in the second exemplary embodiment, since the wireless terminal device 102 includes no base station database 204, it is possible to further suppress the increase in the cost of the wireless terminal device.

Third Exemplary Embodiment

Figure 8:
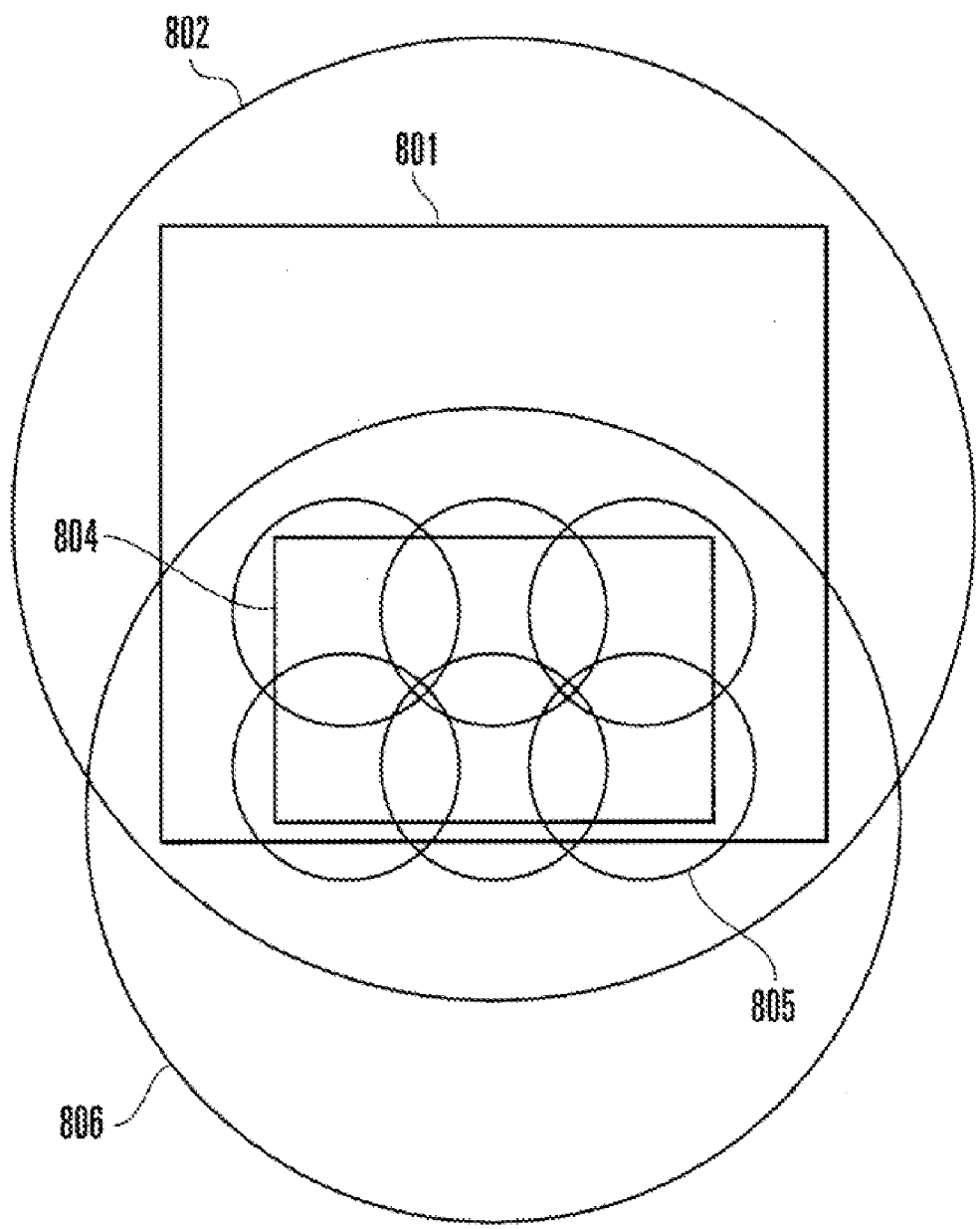
FIG. 8 is an explanatory view showing another example of the coverages of wireless base stations and the receivable ranges of location ID signals from ID transmitters in an actual environment.

FIG. 8 is an explanatory view showing another example of the coverages (communication ranges) of wireless base stations and the coverages (communication ranges, i.e., the receivable ranges of location ID signals from ID transmitters) of ID transmitters in an actual environment. Two large circles indicate coverages 802 and 806 of the wireless base stations. A number of small circles indicate receivable ranges 805 of location ID signals from the ID transmitters. Note that in FIG. 8, only one of the receivable ranges of location ID signals from a number of ID transmitters has a reference numeral.

FIG. 8 corresponds to a sketch of a floor 801 viewed from right above in which two wireless base stations (not illustrated in FIG. 8) are installed. The floor 801 is covered by the coverage 802 of one wireless base station (to be referred to as a wireless base station A). A specific area 804 inside the floor 801 is covered also by the coverage 806 of another wireless base station (to be referred to as a wireless base station B). A number of ID transmitters (not illustrated in FIG. 8) are installed in the specific area 804.

A wireless terminal device located in the floor 801 executes the base station selecting method shown in FIG. 5. A wireless terminal device located in the specific area 804 receives location ID information from an ID transmitter (step S501), and executes the processes of steps S502 and S503. A wireless terminal device located outside the specific area 804 cannot receive location ID information from an ID transmitter, and executes the process of step S506.

For example, when one wireless base station A is assumed to be unable to execute connection processing for all wireless terminal devices that can enter the floor 801, the exemplary embodiment is applied to install another wireless base station B and distribute the load of the wireless base station A to the wireless base station B. This is because a wireless terminal device located in the specific area 804 within the floor 801 selects not the wireless base station A but the wireless base station B.

Fourth Exemplary Embodiment

In the above-described exemplary embodiments, as shown in the flowchart of FIG. 5, the wireless terminal device selects a wireless base station (step S502), and then investigates possibility/impossibility of connection to the wireless base station (step S503). Instead, the wireless terminal device may detect connectable wireless base stations first, and then select a wireless base station to actually connect based on location ID information.

Figure 9:
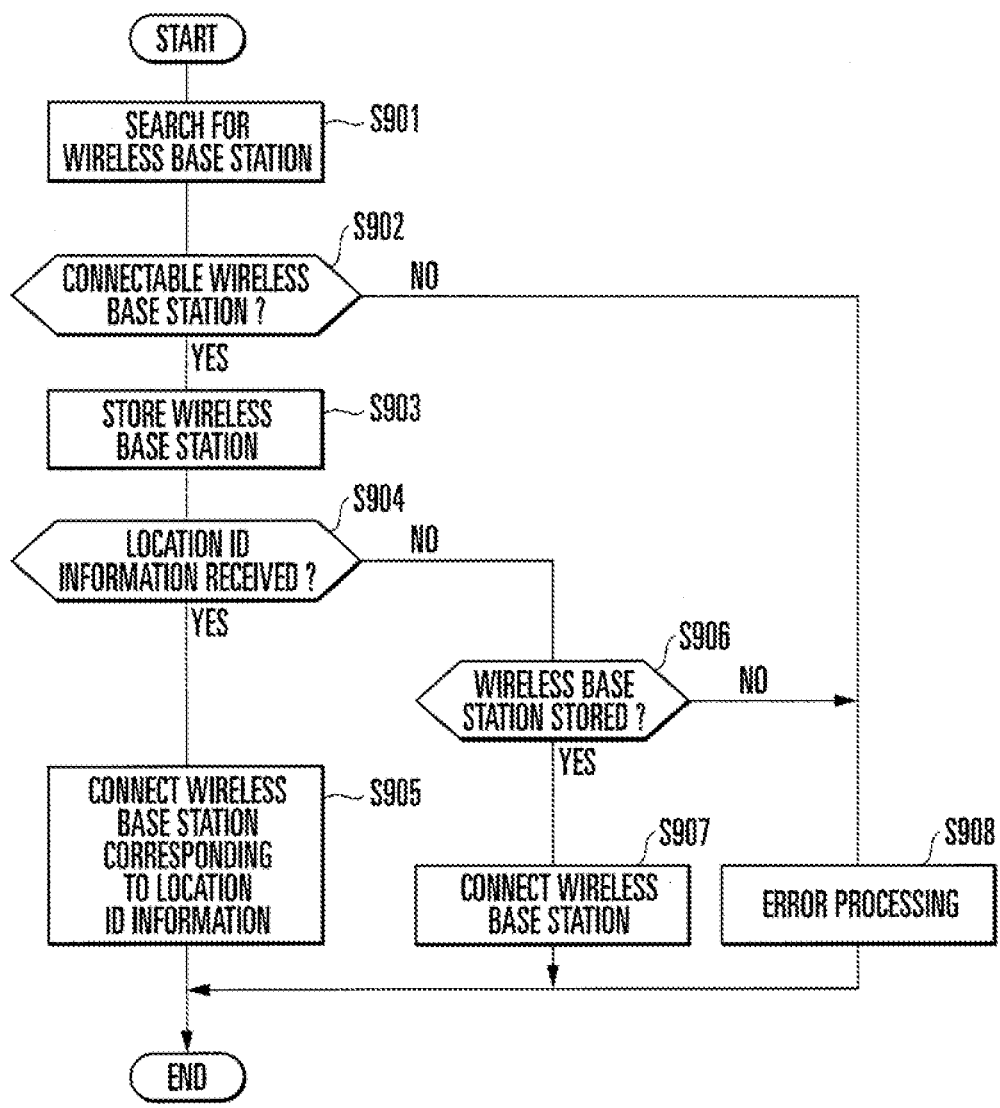
FIG. 9 is a flowchart illustrating another example of the base station selecting method.

FIG. 9 is a flowchart illustrating a base station selecting method of detecting connectable wireless base stations first. Note that the arrangement of a wireless terminal device according to the fourth exemplary embodiment is the same as that shown in FIG. 2.

In the base station selecting method shown in FIG. 9, the wireless terminal device first executes wireless base station search processing to detect connectable wireless base stations (step S901). The wireless base station search processing is general wireless base station search processing using, for example, the received field strength. When one or more connectable wireless base stations have been detected, information representing these wireless base stations is stored in a storage unit provided in the wireless terminal device (steps S902 and S903). If no connectable wireless base station has been found, predetermined error processing is performed (step S908), and the processing ends.

In the state in which the information representing the connectable wireless base stations is stored in the storage unit, a base station selection control unit 202 in the wireless terminal device confirms whether a location ID receiving unit 201 is receiving location ID information (step S904). If the location ID receiving unit 201 is receiving location ID information, the base station selection control unit 202 connects a wireless base station represented by base station information corresponding to the location ID information in a base station database 204 as a partner wireless base station to perform actual communication (step S905). Note that if the storage unit stores no information corresponding to the wireless base station represented by the base station information corresponding to the location ID information, error processing is executed.

If the location ID receiving unit 201 is not receiving location ID information, and the storage unit stores information representing a wireless base station, the base station selection control unit 202 connects the wireless base station represented by the information as a partner wireless base station to perform actual communication (steps S906 and S907). If the storage unit stores no information representing a wireless base station, error processing is executed (step S908).

Even when the base station selecting method shown in FIG. 9 is executed, the same effects as in the first exemplary embodiment can be obtained.

Note that in this exemplary embodiment, a wireless terminal device having the base station database 204 has been exemplified. However, the fourth exemplary embodiment can also be implemented using a wireless terminal device according to the second exemplary embodiment which has no base station database 204.

In the above-described exemplary embodiments, the wireless terminal device selects a base station. However, the base station selecting method of each exemplary embodiment is also applicable to cause the wireless terminal device to switch the wireless base station during communication.

As described in the above exemplary embodiments, upon receiving a plurality of pieces of location ID information from the ID transmitters, the wireless terminal device determines the connection destination wireless base station in accordance with a predetermined conversion rule. This enables to easily execute base station selection processing.

As described in the above exemplary embodiments, if the wireless terminal device cannot receive location ID information, the connection destination wireless base station is determined by performing base station search processing based on radio signals from the wireless base stations. This allows to reduce occasions in which no wireless base station is selected.

The present invention has been described above with reference to the exemplary embodiments. However, the present invention is not limited to the above-described exemplary embodiments. The arrangement and details of the invention can be variously modified within the scope of the invention, and these modifications will readily occur to those skilled in the art.

This application is the National Phase of PCT/JP2008/069868, filed Oct. 31, 2008, which is based upon and claims the benefit of priority from Japanese patent application No. 2007-286569, filed on Nov. 2, 2007, the disclosure of which is incorporated herein in its entirety by reference.

INDUSTRIAL APPLICABILITY

The present invention is applicable to a system which causes a wireless terminal device to communicate with another terminal device via a wireless base station.

The invention claimed is:

1. A base station selecting method comprising the steps of:
receiving location ID information transmitted, by a communication scheme different from that of a wireless base station, from each of a plurality of ID transmitters provided outside the wireless base station and in a communication range of the wireless base station, the location ID information containing information for identifying an installation location of each ID transmitter and base station information for specifying the wireless base station; and
determining, as a connection destination wireless base station, the wireless base station specified by the base station information contained in the received location ID information.

2. A wireless terminal device comprising:
a location ID receiving unit which receives location ID information transmitted, by a communication scheme different from that of a wireless base station, from each of a plurality of ID transmitters provided outside the wireless base station and in a communication range of the wireless base station, the location ID information containing information for identifying an installation location of each ID transmitter and base station information for specifying the wireless base station; and
a base station selection control unit which determines, as a connection destination wireless base station, the wireless base station specified by the base station information contained in the received location ID information.

* * * * *